United States Patent [19]
Yamamoto et al.

[11] Patent Number: 5,144,451
[45] Date of Patent: Sep. 1, 1992

[54] PORTABLE LIQUID-CRYSTAL TV SET WITH A VIDEO RECORDER/PLAYER

[75] Inventors: Mitsuo Yamamoto; Mineo Sato, both of Kanagawa, Japan

[73] Assignee: U.S. Philips Corporation, New York, N.Y.

[21] Appl. No.: 581,831

[22] Filed: Sep. 12, 1990

[30] Foreign Application Priority Data

Sep. 14, 1989 [JP] Japan .................. 1-107142[U]

[51] Int. Cl.⁵ .............................................. H04N 5/64
[52] U.S. Cl. ............................................. 358/254
[58] Field of Search ................ 358/254, 236, 231; 340/700; 364/708

[56] References Cited

U.S. PATENT DOCUMENTS

| | | | |
|---|---|---|---|
| 4,571,456 | 2/1986 | Paulsen et al. | 340/700 |
| 4,658,298 | 4/1987 | Takeda et al. | 358/254 |
| 4,781,422 | 11/1988 | Kimble | 340/700 |
| 4,803,560 | 2/1989 | Matsunaga et al. | 358/254 |
| 4,809,089 | 2/1989 | Richie | 358/254 |
| 4,832,419 | 5/1989 | Mitchell et al. | 358/254 |
| 4,969,046 | 11/1990 | Sugimoto et al. | 358/254 |
| 4,978,949 | 12/1990 | Herron et al. | 340/700 |

Primary Examiner—Stephen Brinich
Attorney, Agent, or Firm—Norman N. Spain

[57] ABSTRACT

A portable liquid-crystal TV set with a video recorder/player has a cover portion and case portion which are arranged so as to be foldable. The case portion incorporating a video-tape cassette holder and a recorder/player portion for cooperating with the video tape. The cover portion being provided at its inner surface with a small-sized liquid-crystal TV screen and a loudspeaker. Reception of the TV broadcast or monitoring of the reproduction from the video tape being performed with the cover portion being open. A plurality of rows of switch buttons being provided so that operation of the video recorder/player portion, which does not need the liquid-crystal TV screen, can be carried out with the cover portion being closed.

1 Claim, 1 Drawing Sheet

PORTABLE LIQUID-CRYSTAL TV SET WITH A VIDEO RECORDER/PLAYER

BACKGROUND OF THE INVENTION

The invention relates to a portable liquid-crystal TV set with a video recorder/player. An apparatus of this kind is commonly known and has the TV set and the video-recorder/player arranged next to each other.

SUMMARY OF THE INVENTION

It is the object of the invention to provide a portable liquid-crystal TV set a video recorder/player of compact size of a convenient arrangement.

To this end a portable liquid-crystal TV set with a video recorder/player in accordance with the invention is characterized by the provision of a cover portion and a case portion which are arranged so as to be foldable, the case portion incorporating a video-tape cassette holder and a recorder/player portion for cooperating with the video tape, the cover portion being provided at its inner surface with a small-sized liquid-crystal TV screen, reception of the TV broadcast or monitoring of the reproduction from the video tape being performed with the cover portion being open, operation of the video recorder/player portion, which does not need the liquid-crystal TV screen, can be carried out with the cover portion closed.

An embodiment of the portable liquid-crystal TV set with a video recorder/player is characterized in having a plurality of rows of switch buttons comprising an upper row of switch buttons including first buttons for activating the recorder/player portion and a lower row of switch buttons which includes second buttons for utilizing memory functions, in the closed position of the cover portion the lower row of switch is covered by the cover portion and the upper row of switch buttons if accessible.

In the closed position also operation of the TV set are then covered.

DETAILED DESCRIPTION OF THE INVENTION

Figure 1:
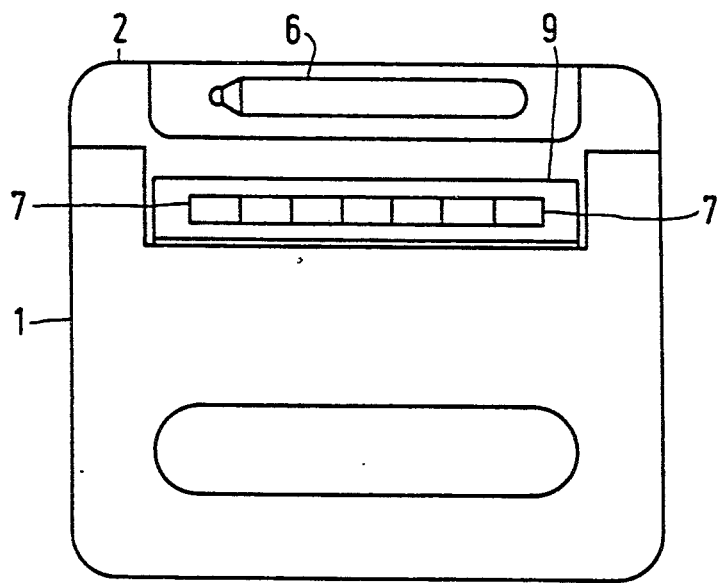
FIG. 1 is a plan view of the portable liquid-crystal TV set with a video recorder player of the invention with the cover closed.
Figure 2:
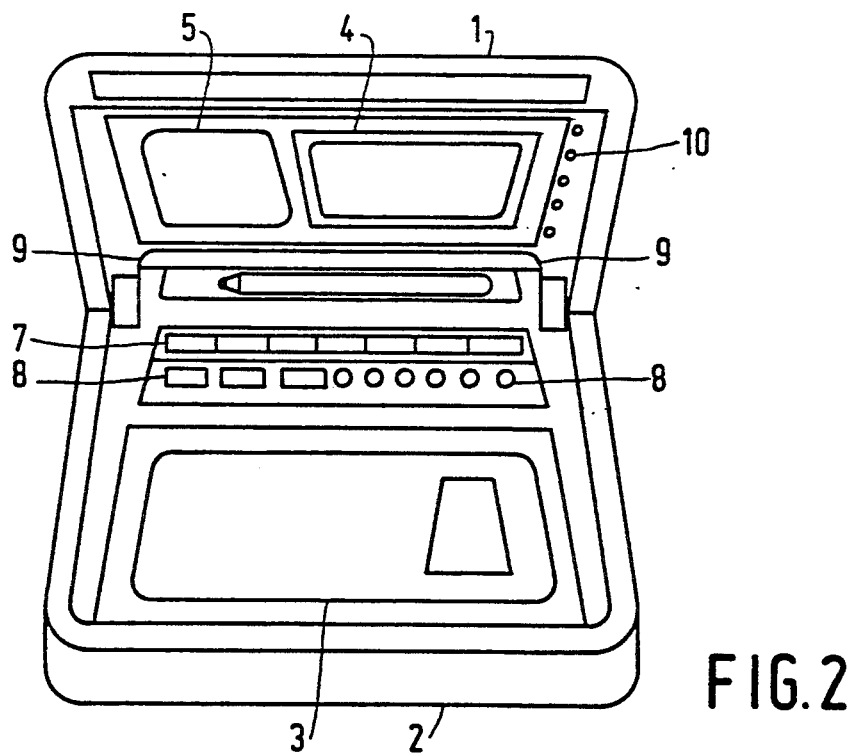
FIG. 2 is a perspective view of the same apparatus with the cover open.

An embodiment of a portable liquid-crystal TV set with a video recorder/player in accordance with the invention will now be described, by way of example, with reference tot eh figures of the drawings:

FIGS. 1 and 2 illustrate a plan view and a perspective view of a portable liquid-crystal TV set with a video recorder/player provided in accordance with the invention. This TV set comprises a cover portion 1 and a case portion 2, and in FIG. 2 the cover portion 1 is in the open state. These two portions are hingedly connected to each other. In the case portion 2, there are provided a video tape cassette holder 3, a video recorder/player portion (not shown), a first row of switch buttons 7 for actuation of the recorder/player and a second row of switch buttons 8 for utilizing memory functions and other functions of the recorder/player. The cover potion 1 is provided at its inner surface with a liquid-crystal TV screen 4, a loudspeaker 5 and a set of control buttons 10.

A part of the cover portion 1 is cut away or opened as indicated at 9 so that the first row of switch buttons 7 can be accessed when the cover portion 1 is closed as shown in FIG. 1. Shown at 6 in FIG. 1 is an antenna for the TV set.

According to the above structure, the video recorder/player can be operated even when the cover portion 1 is closed.

I claim:

1. A video device comprising a combination of a portable liquid-crystal TV set and a video recorder-player, said device comprising a cover portion and a case portion, said cover portion being foldable so as to provide open and closed positions in regard to said case portion, said case portion comprising a video tape cassette holder and a video recorder player portion for cooperating with a video tape cassette present in said video tape cassette holder and a plurality of rows of switch buttons comprising an upper row of switch buttons including first buttons for activating said video recorder-player portion and a lower row of switch buttons including second buttons for utilizing memory functions, said cover portion, int he closed position, covering said lower row of switch buttons but leaving visible and accessible said upper row of switch buttons, said cover portion being provided at its surface opposing said cover portion with a small-sized liquid crystal TV screen for receiving TV broadcasts or for monitoring reproduction of TV broadcasts or said monitoring being carried out with said cover portion being in said open position and operation of said video recorder-player portion, not requiring said liquid crystal TV screen, capable of being carried out with said cover portion in the closed position.

* * * * *